United States Patent [19]
Nozue et al.

[11] Patent Number: 4,992,798
[45] Date of Patent: Feb. 12, 1991

[54] INTERFERENCE CANCELLER

[75] Inventors: Yoshihiro Nozue, Nishinasuno; Toshiyuki Takizawa, Otawara, both of Japan

[73] Assignee: Fujitsu Limited, Kawasak, Japan

[21] Appl. No.: 554,984

[22] Filed: Jul. 17, 1990

Related U.S. Application Data

[63] Continuation of Ser. No. 265,511, Nov. 1, 1988, abandoned.

[30] Foreign Application Priority Data

Nov. 10, 1987 [JP] Japan .................. 62-282053
Dec. 11, 1987 [JP] Japan .................. 62-312038

[51] Int. Cl.⁵ .............. H01Q 21/06; H01Q 21/24; H04B 7/10
[52] U.S. Cl. ........................ 342/362; 455/295; 455/296
[58] Field of Search ............. 342/362; 455/295, 296, 455/305

[56] References Cited

U.S. PATENT DOCUMENTS

| | | | |
|---|---|---|---|
| 4,293,945 | 10/1981 | Atia et al. | 370/17 |
| 4,321,705 | 3/1982 | Namiki | 455/296 |
| 4,575,862 | 3/1986 | Tahara et al. | 455/296 |
| 4,644,562 | 2/1987 | Kavehrad et al. | 455/295 |

FOREIGN PATENT DOCUMENTS

2367384 5/1978 France .

OTHER PUBLICATIONS

IEEE Global Telecommunications Conference, Houston, Dec. 1-4, 1986, vol. 1, "Cross Polarization Interference Canceller for QAM Digital Radio Systems with Asynchronous Clock and Carrier Signals", by B. Lankl, pp. 523-529.

Patent Abstracts of Japan, vol. 10, No. 145 (E-407)[2202], May 28, 1986, and JP-A-61 5642 (Nippon Denki K.K.), 11-01-86.

Patent Abstracts of Japan, vol. 8, No. 231 (E-274)[1668], Oct. 24, 1984, and JP-A-59 112 738 (Nippon Denshin Denwa Kosha), 29-06-1984.

*Primary Examiner*—Theodore M. Blum
*Attorney, Agent, or Firm*—Staas & Halsey

[57] ABSTRACT

In a digital radio transmission system for transmitting independent dual data by using cross polarization, an interference canceller detects cross polarization interference either directly or indirectly. An interference compensating signal is generated and applied to the main signal to cancel the interference element. In a case where no interference element is present, deterioration of cross polarization discrimination from an interference cancelling circuit is prevented by first determining whether an interference element actually exists and applying the interference compensating signal only when it does exist. The interference compensating signal can be attenuated based on the value of interference element so as to prevent undo deterioration of the cross polarization discrimination when the interference element is minimal.

23 Claims, 7 Drawing Sheets

INTERFERENCE CANCELLER

This is a continuation of co-pending application Ser. No. 07/265,511 filed on Nov. 1, 1988, now abandoned.

BACKGROUND OF THE INVENTION

1. Field of the Invention

The present invention relates to an interference canceller and, more particularly, to a cross polarization interference canceller.

In a digital radio transmission system for transmitting independent dual data by using cross polarizations, such as vertical (V) and horizontal (H) polarizations, of the same channel, an XPIC (cross polarization interference canceller) utilizing a transversal-type filter is generally used as a means for compensating XPD (cross polarization discrimination), which deteriorates in the transmission path or circuit elements.

The XPIC of the present invention compensates for cross polarization interference and does itself cause deterioration of XPD.

2. Description of the Related Art

FIG. 1 is an example of a transversal-type equalizer of the prior art. In FIG. 1, an analog type transversal equalizer used in a multi-level QAM system is illustrated. An intersymbol interference element for the main signal (not illustrated) of channels I and Q of the horizontal polarization is obtained at the output terminal O, and the initial waveform, not including interference distortion, can be recovered by removing the intersymbol interference element from the main signal.

As shown in FIG. 1, the transversal equalizer of the prior art provides, for the channel I, cascade-connected delay lines 21-1 through 21-6 having a delay time, and constant multipliers 22-1 through 22-7 connected before or after the delay lines. Also provided, for the channel Q, are delay lines 23-1 through 23-6 and constant multipliers 24-1 through 24-7.

The constant multipliers 22-1 through 22-7 and 24-1 through 24-7 respectively receive constant factors $C_{-3}$ through $C_3$ and $D_{-3}$ through $D_3$ from a control circuit 25 and output tap outputs for equalization to an adder 26. The adder 26 analogously adds the tap outputs and outputs the result to the output terminal O.

Generally, the practical constant multiplier may be formed as a variable attenuator having a phase inverting function with a dynamic range of about 40-60 dB. It is given the phase information depending on positive or negative control voltage. The practical constant multiplier is also given the attenuating information by an absolute value of the control voltage of the control circuit 25.

Each constant multiplier obtains the necessary tap output by receiving a constant of tap from the control circuit 25, but also outputs a constant residual deterioration element even if the main signal is not deteriorated. Since the individual residual deterioration elements from each constant multiplier are combined in the adder 26, the resulting total residual deterioration element is so large that it cannot be neglected. Particularly when a passing delay time difference of fading to be equalized becomes large, since a number of constant multipliers increases and the constant multipliers are required for both channels I and Q in the QAM, the total residual deterioration element becomes significant due to the number of constant multipliers in use. Therefore, a problem arises in that the main signal receives, even when the signal is not deteriorated, more intensified fixed deterioration from the transversal-type equalizer within the cross polarization interference canceller.

For instance, if it is supposed that a constant multiplier has a dynamic range of 50 dB, a transversal type equalizer of 5 taps provides a D/U (desired/undesired) ratio of 40 dB. However, an equalizer of 7 taps provides a D/U ratio of 39 dB, and an equalizer of 9 taps provides a D/U ratio of 38 dB. Quite clearly, as the number of taps increases, the D/U ratio deteriorates.

SUMMARY OF THE INVENTION

In view of the problems associated with the prior art, it is therefore an object of the present invention to prevent an increase in the fixed deterioration of a main signal when a compensating signal is applied.

According to the present invention, interference by a secondary signal included in the main signal is detected, and an output of the transversal filter is attenuated when the interference is relatively small. Interference can be obtained directly by detecting the main signal clock included in the main signal and the beat element by the secondary signal clock. Moreover, interference can also be obtained indirectly from the tap control signal of a transversal filter.

According to the present invention, an interference canceller for cancelling interference in a first signal in a communication system that simultaneously processes more than one signal comprises equalizer means for equalizing the first signal, compensating signal generating means for generating a compensating signal from a second signal, first timing recovering means for detecting an interference element in the equalized first signal, and first control means for controlling application of the compensating signal to the first equalized signal based on the detected interference element.

Further, the present invention also comprises a compensating signal generator for generating a compensating signal for an interfered signal, comprising a predetermined number of first channel delay units connected in series on the first channel, a predetermined number of second channel delay units connected in series on the second channel, a predetermined number of first channel tap constant multipliers, the predetermined number being one more than the predetermined number of first channel delay units, connected in branches from the first channel before and after each of said first channel delay units, a predetermined number of second channel tap constant multipliers, the predetermined number being one more than the predetermined number of second channel delay units, connected in branches from the second channel before and after each of the second channel delay units, a plurality of adders for adding outputs from predetermined ones of the first and second channel tap constant multipliers, a plurality of variable attenuators corresponding to and connected to receive an output from one of the adders, each of the variable attenuators attenuating the output of its respective adder, and adder means connected to said variable attenuators for receiving and adding outputs of the variable attenuators and outputting the compensating signal.

Also according to the present invention, a method for cancelling interference in a signal is also provided, comprising the steps of equalizing a first signal, generating a compensating signal for the first signal from a second signal, detecting an interference element in the first equalized signal, and controlling application of the compensating signal to the first equalized signal based on the detected interference element.

DESCRIPTION OF THE PREFERRED EMBODIMENTS

Figure 1:
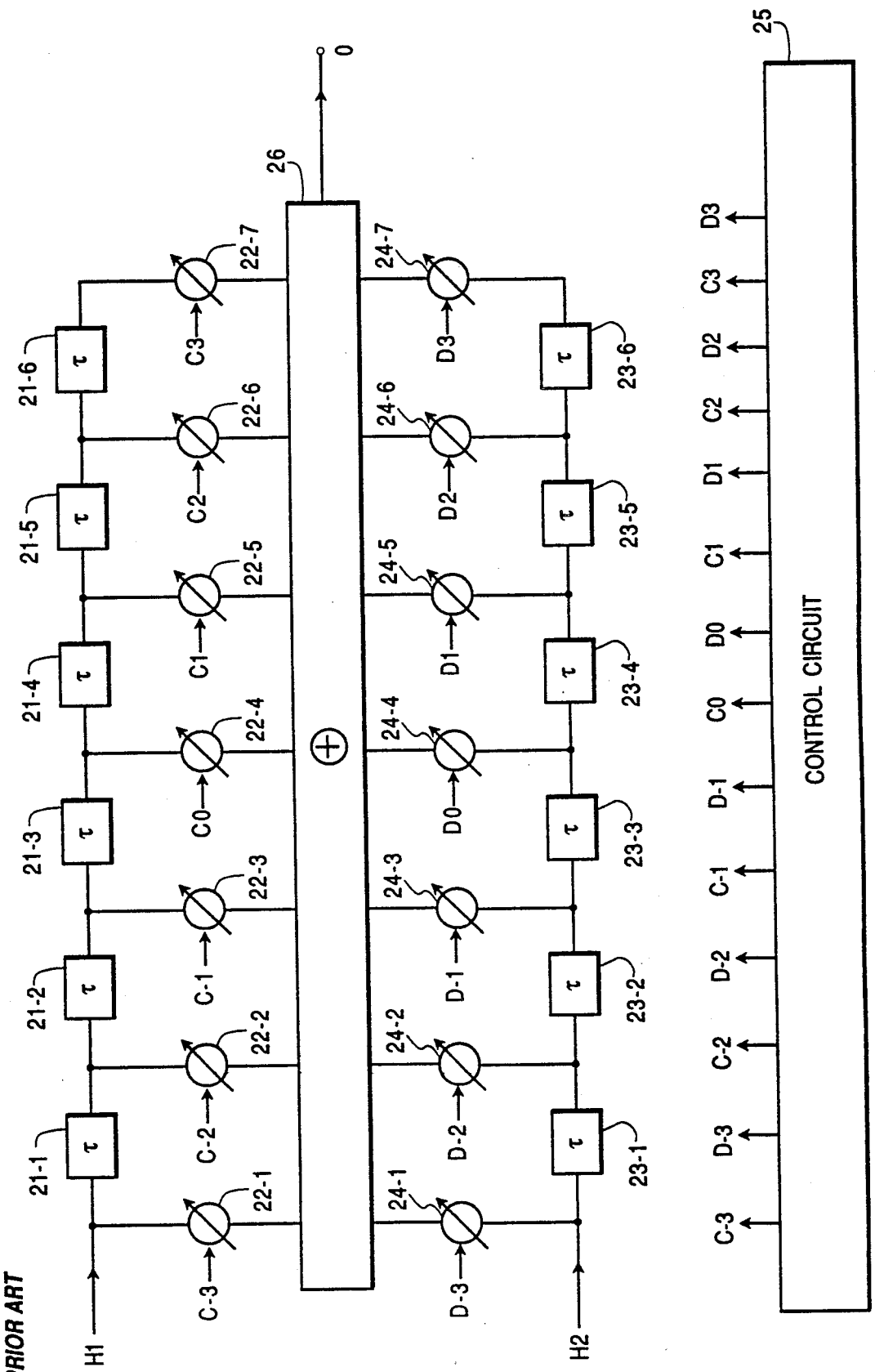
FIG. 1 is a block diagram of an interference canceller according to the prior art.
Figure 2:
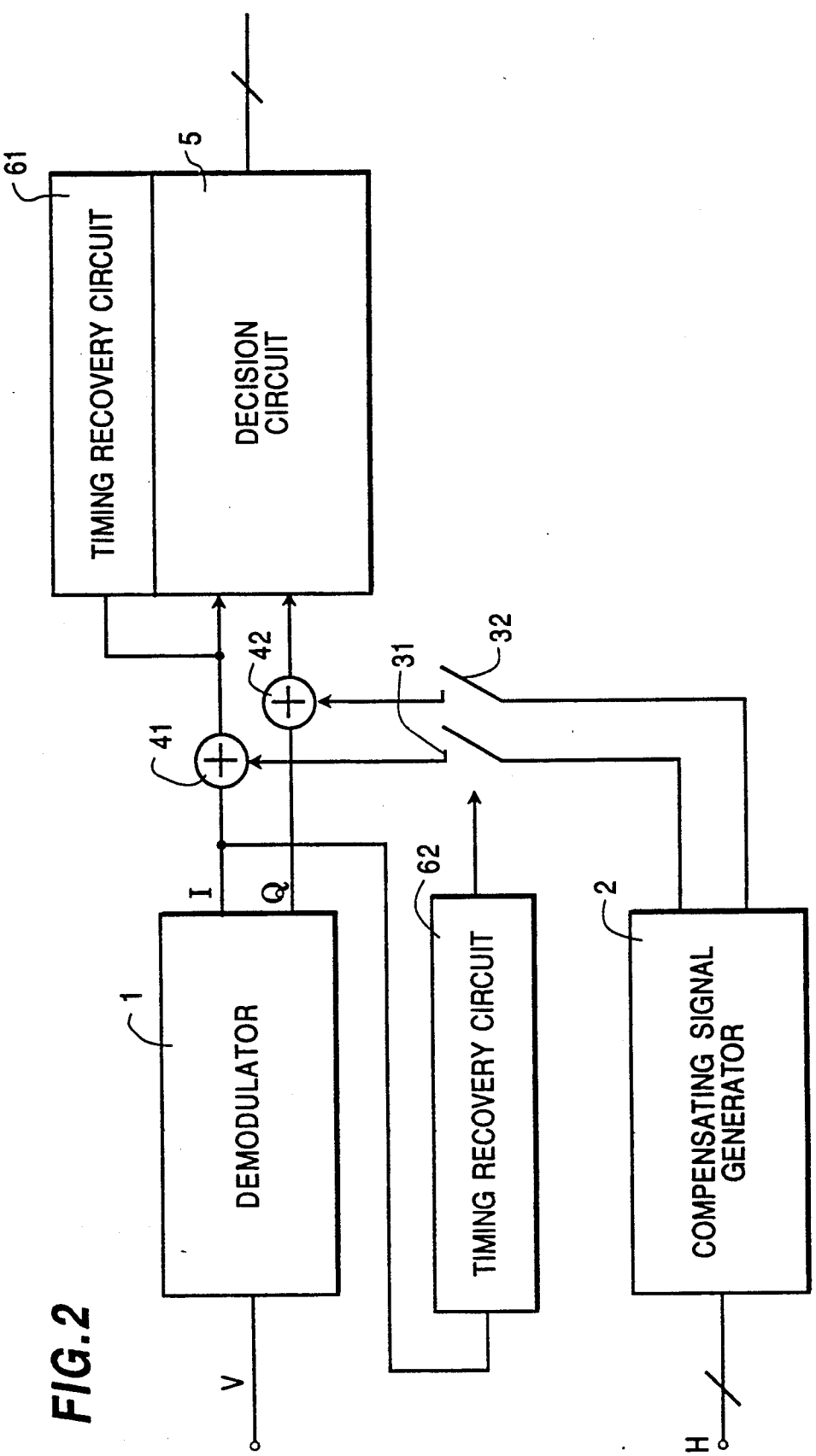
FIG. 2 is a basic block diagram of first and second embodiments of the present invention.

FIG. 2 is a basic block diagram of the present invention.

In this figure, a vertically polarized wave V is input to a demodulator 1, which outputs a baseband signal over channels I and Q after eliminating waveform distortion in the polarized wave V. A horizontally polarized wave H is input to a compensating signal generating circuit 2, which generates a tap output for equalization of the baseband signal.

When XPD of the baseband signal, which is the output of the demodulator 1, deteriorates, the switches 31, 32 are closed and the interference element can be eliminated from the baseband signal of the V polarized wave by subtracting the tap output, which is the output of the compensating signal generating circuit 2, from the I and Q channel elements of the baseband signal at adders 41, 42, respectively, which comprise an adding unit 4.

A decision circuit 5 samples outputs of the adders 41, 42 and obtains the demodulated data depending on a clock signal, which a timing recovery circuit 61 obtains from the output of the adder 41.

In general, frequencies of data transmitted by the V and H polarized waves are a little different. If XPD deteriorates because the interference element is mixed into the baseband signal of the output of the demodulator 1, when the clock signal is recovered by the timing recovery circuit 62 based on such a deteriorated signal, a low frequency modulated element having a difference frequency $\Delta f$ of the data rate between the polarized waves V and H is added to the recovered clock signal because the cross polarized element is mixed. Deterioration of XPD can be detected by fullwave rectification of the modulated element (beat element) $\Delta f$. When the XPD of the baseband output of the demodulator 1 is not deteriorated, the timing recovery circuit 62 does not apply the output of the compensating signal generating circuit 2 to the adders 41, 42; rather, the switches 31, 32 are turned off. In this way, an increase of fixed deterioration caused by the compensating signal generating circuit 2, when no equalization is being performed, can be prevented.

Figure 3:
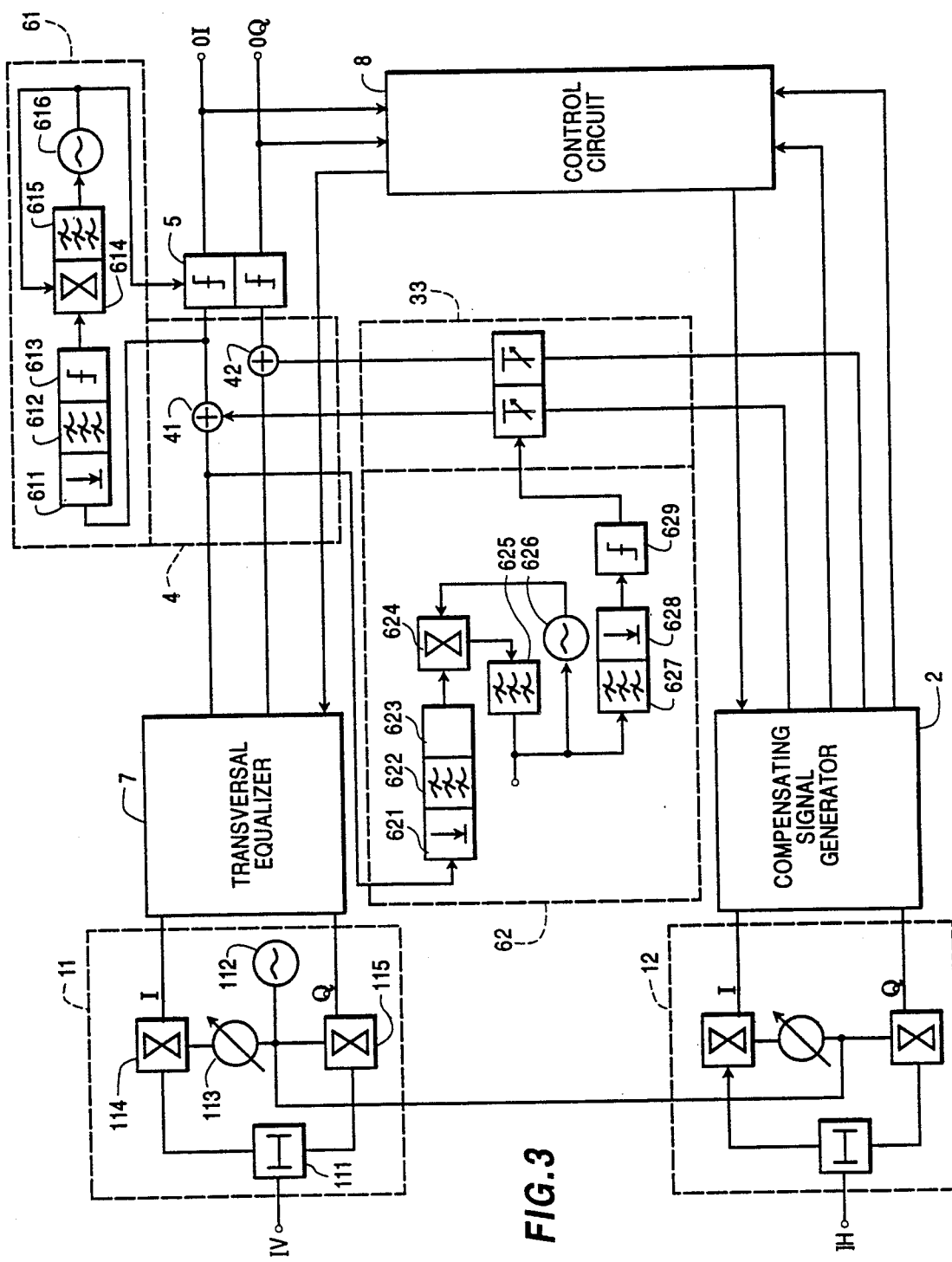
FIG. 3 is a detailed block diagram of the first embodiment of the present invention.

FIG. 3 is a detailed block diagram of a first embodiment of the present invention generally illustrated in FIG. 2.

In this figure, a signal input to an IF input terminal IV is orthogonally detected by a first orthogonal detector 11 and is demodulated. The first orthogonal detector 11 outputs the demodulated signal over channels I and Q. The orthogonal detector 11 is formed by a hybrid (H) 111 which separates the received signal, a phase shifter 113 which shifts the phase of the carrier and generates a pair of reference carriers having a phase difference of 90° and detectors or mixers 114 and 115, which synchronously detect the separated received signals with the reference carriers. The output of the orthogonal detector 11 is waveform equalized by a transversal equalizer 7 to remove the waveform distortion.

The signal of a different polarized wave side is input to an IF input terminal IH and is orthogonally detected by a second orthogonal detector 12, like the main signal. This signal is demodulated, and the demodulated output is processed by the compensating signal generating circuit 2, which uses a transversal-type filter. The output signal from the compensating signal generating circuit 2 is combined with the output of the transversal equalizer 7 at the adding unit 4 to equalize the polarization interference element.

A timing recovery circuit 61 is formed by a full-wave rectifier 611, a tank limiter consisting of a band-pass filter 612 and a comparator 613, and a phase comparison loop consisting of a phase comparator 614, a loop filter 615 and a voltage-controlled oscillator 616. This circuit 61 recovers the clock signal from an output of the adder 41. Depending on the clock signal, the decision circuit 5 samples the baseband signal having channels I and Q output from the adding unit 4 and outputs a digital data train to output terminals OI, OQ. A control circuit 8 also receives the outputs of the decision circuit 5 and signal information from the compensating signal generating circuit 2 and generates a control signal for the transversal equalizer 7 and the compensating signal generating circuit 2.

When XPD has deteriorated, an input of the adding unit 4 includes the interference element. The timing recovery circuit 62 also receives the signal input to the adding unit 4 having the interference element, and detects the existence of the interference element.

The timing recovery circuit 62 is composed of a full wave rectifier 621, a tank limiter consisting of a band-pass filter 622 and a comparator 623, a phase comparator 624, a loop filter 625, a voltage-controlled oscillator 626, a band-pass filter 627, a full wave rectifier 628 and a decision circuit 629.

The signal including the interference element, which is an output of the transversal equalizer 7, is input to the timing recovery circuit 62. The signal is first rectified by the full wave rectifier 621, and thereafter processed by a phase comparison loop consisting of the phase comparator 624, the loop filter 625 and the voltage-controlled oscillator 626 after being processed by the band-pass filter 622 and the comparator 623. The beat element of amplitude, which is a frequency difference element of a pair of data rates of the main signal and the interference signal and corresponds to a degree of deterioration of XPD (amount of interference element), is produced at the output terminal of the loop filter 625. This beat element extracted with a band-pass filter 627 and then detected by the full wave rectifier 628 and the decision circuit 629 to obtain a voltage proportional to the amplitude of the beat element. This voltage controls a variable attenuator 33. As an output of the timing recovery circuit 62 becomes closer to zero, attenuation by the variable attenuator 33 is correspondingly increases.

In place of the variable attenuator 33, the switches 31, 32, as shown in FIG. 2, may be used. Also, in the embodiment illustrated in FIG. 3, the beat element can be obtained through phase comparison in the PLL constitution, but the present invention is not limited only to such a constitution.

Figure 4:
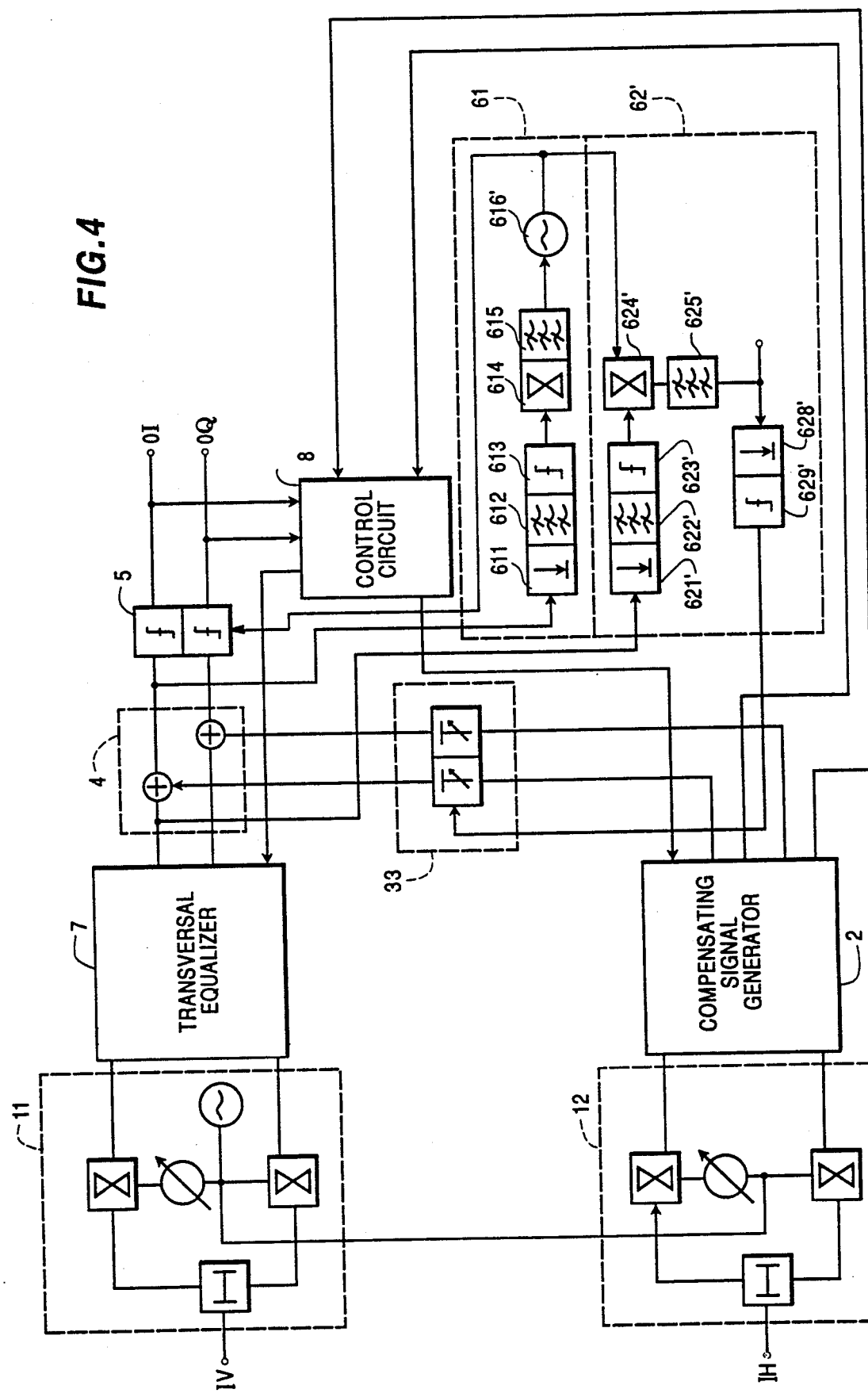
FIG. 4 is a detailed block diagram of the second embodiment of the present invention.

FIG. 4 is a block diagram illustrating the second embodiment of the present invention. In FIG. 4, elements like those illustrated in FIG. 3 have like reference numerals.

The embodiment of the present invention illustrated in FIG. 4, is quite similar to that illustrated in FIG. 3, the only difference being found in the timing recovery circuit 62' of FIG. 4. In the timing recovery circuit 62', an output of the tank limiter, consisting of a band-pass filter 622' and a comparator 623', is compared in phase with the clock signal output by the timing recovery circuit 61. Since the output of the timing recovery circuit 61 does not include the interference element, a beat element of the amplitude corresponding to the amount of the interference element can be obtained, as discussed above for the embodiment of FIG. 3, at the output terminal by applying an output of a phase comparator 624' to a loop filter 625'. A control voltage of the variable attenuator 33 can be obtained by applying the beat element to a fullwave rectifier 628' and a comparator 629', as described above for the first embodiment. In this embodiment, the voltage-controlled oscillator 616' is also used by the timing recovery circuit 62' in its phase comparison loop.

As explained above, the transversal equalizer 7 and the compensating signal generating circuit, 2 are such that the baseband signal can be formed in the IF band, and, even in such a case, the beat element can be obtained in the same way as described above.

Figure 5:
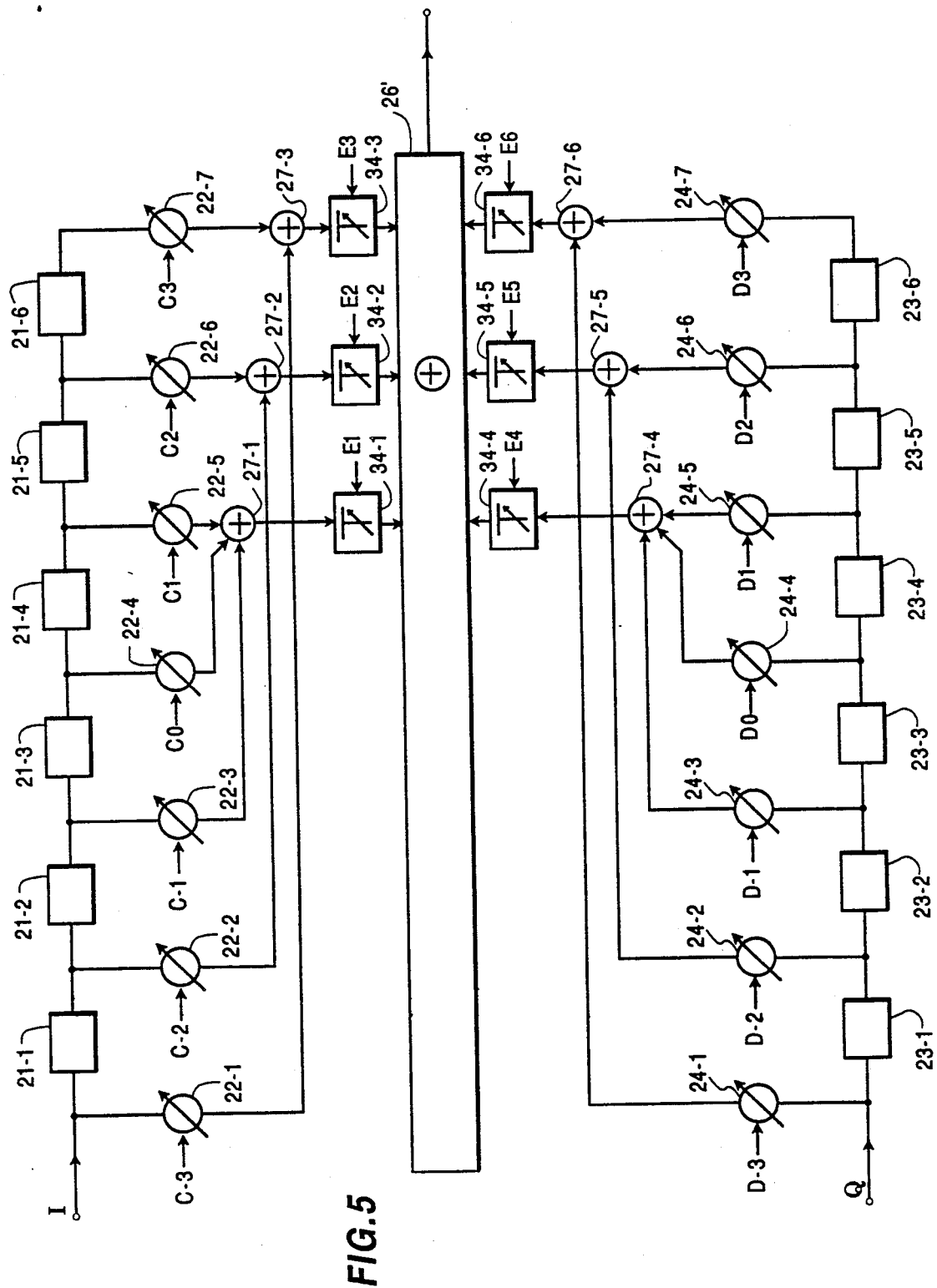
FIG. 5 is a block diagram of a third embodiment of the present invention.

FIG. 5 is a block diagram of a transversal filter according to a third embodiment of the present invention for indirectly obtaining the interference element in the main signal. Further, this transversal filter generates a tap output that does not deteriorate the XPD of the main signal.

In this figure, the I channel is input at input terminal I and the Q channel is input at input terminal Q. Elements 21-1 through 21-6 are I channel delay lines and elements 23-1 through 23-6 are Q channel delay lines. Elements 22-1 through 22-7 are tap constant multipliers of the I channel and elements 24-1 through 24-7 are tap constant multipliers of the Q channel. The tap constant multipliers 22-1 through 22-7 are supplied with the tap constants $C_{-3}$ through $C_3$, respectively, while tap constant multipliers 24-1 through 24-7 are supplied with the tap constants $D_{-3}$ through $D_3$, respectively.

On the I channel side of the transversal filter, outputs of the tap constant multipliers 22-3 through 22-5, which are symmetrically arranged around the tap constant multiplier 34-1, are combined in an adder 27-1. Outputs of the tap constant multipliers 22-2 and 22-6 are combined in an adder 27-2, and outputs of the tap constant multipliers 22-1 and 22-7 are combined in an adder 27-3. On the Q channel side, similarly to the above, outputs of the tap constant multipliers 24-3 through 24-5 are combined in an adder 27-4, while outputs of the tap constant multipliers 24-2 and 24-6 are combined in an adder 27-5 and outputs of the tap constant multipliers 24-1 and 24-7 are combined in an adder 27-6.

Outputs of the adders 27-1 through 27-6 are respectively input to a hybrid adder 26' through variable attenuators 34-1 through 34-6.

Attenuation of signals at the variable attenuators 34-1 through 34-6 is respectively controlled by the control signals $E_1$ through $E_6$. The control signals $E_1$ through $E_6$ are determined based on the tap constants. For example, the control signal $E_1$ is calculated by determining the larger value among the absolute values of the tap constants $C_{-1}$ through $C_1$ of the tap constant multipliers 22-3 through 22-5. The other control signals are similarly determined based on their associated tap constants, as illustrated in FIG. 5 (e.g., the control signal $E_2$ is determined by obtaining the larger of the absolute values of the tap constants $C_{-2}$ and $C_2$). By applying the thus determined control signals to the attenuators 34-1 through 34-6, signal attenuation is determined.

Figure 6:
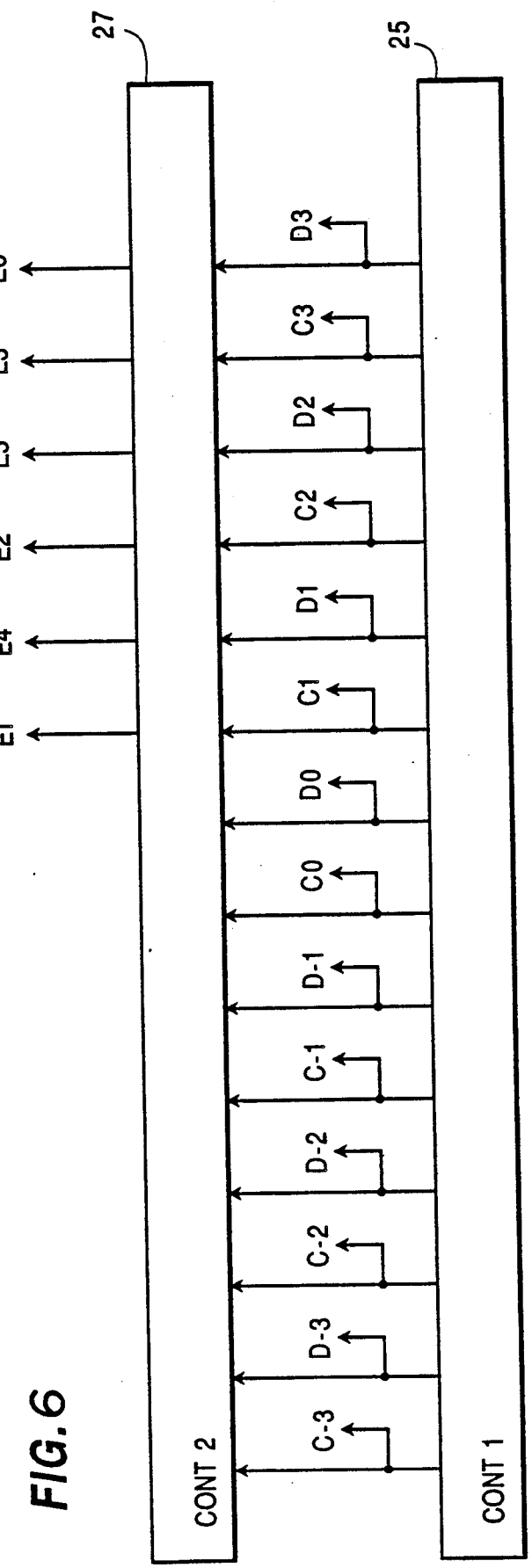
FIG. 6 is a block diagram of a control circuit for generating the control signals for the embodiment illustrated in FIG. 5.

FIG. 6 is a block diagram of an example of the control circuit which generates the tap constants $C_{-3}$ through $C_3$ and $D_{-3}$ through $D_3$. In this figure, the control circuit (CONT1) 25 outputs the tap constants $C_{-3}$, $C_{-2}$, $C_{-1}$, $C_0$, $C_1$, $C_2$, $C_3$, $D_{-2}$, $D_{-1}$, $D_0$, $D_1$, $D_2$, $D_3$, depending on the amplitude and shape of distortion of the main signal for compensating for the interference waveform of the main signal.

The control circuit (CONT2) 27 is used for obtaining the control signals $E_1$ through $E_6$, which are based on the tap constants.

For example, for a given signal having a particular kind of waveform distortion, to equalize the signal, the control circuit 25 outputs a tap constant $C_{-1}$ to provide an output only from the tap constant multiplier 22-3, and control circuit (CONT2) 27 outputs the control signal $E_1$. Thus attenuation by the variable attenuator 34-1 is decreased and the waveform of the main signal can be equalized. In this case, since the control signals $E_2$ through $E_6$ applied to the variable attenuators 34-2 through 34-6 are zero, outputs of all tap constant multipliers other than the tap constant multipliers 22-3 through 22-5 are attenuated. As a result, the fixed deterioration of the main signal without interference by all tap constant multipliers other than 22-3 through 22-5 can be prevented, and the dynamic range of tap constant multiplier can be expanded.

Figure 7:
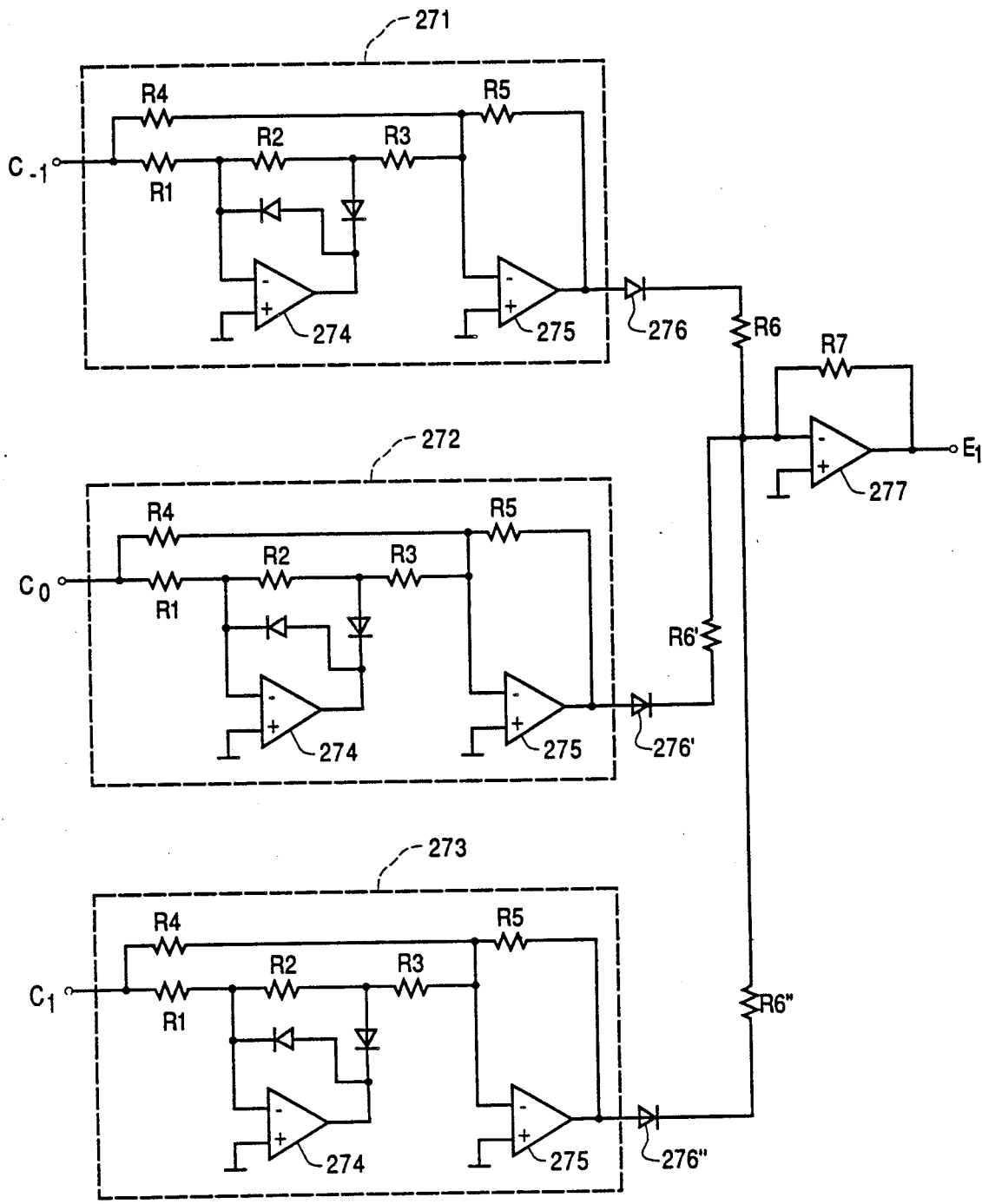
FIG. 7 is a circuit diagram illustrating a portion of the control circuit illustrated in FIG. 6.

FIG. 7 is a circuit diagram illustrating an example of a portion of the control circuit (CONT2) 27 shown in FIG. 6. In this figure, an absolute value circuit 271 receives a tap constant $C_{-1}$ and outputs a value corresponding to the absolute value of the tap constant $C_{-1}$. At the same time, the absolute value circuit 272 receives a tap constant $C_0$ and outputs a value corresponding to its absolute value, and an absolute value circuit 273 receives a tap constant $C_1$ and outputs a value corresponding to its absolute value.

The circuits 271 through 273 have the same constitution. A pair of operation amplifiers 274 and 275 are cascade-connected and outputs thereof from each of the circuits 271-273 are combined by an operation amplifier 277 through respective diodes 276, 276' and 276" and resistors R6, R6' and R6". Thereby, the maximum output of the adders 27-1 through 27-6 can be obtained from the outputs of the absolute value circuits 271-273. Resistors $R_1$ through $R_5$ are the input resistance and feedback resistance of the operation amplifiers 274 and 275. When the resistors $R_1$ through $R_4$ are in the relationship of $R_2/R_1 = 2R_3/R_4$, the absolute value circuit 271 outputs a voltage $V_0 = (R_5/R_4)V_i$.

The relationship of resistances $R_1$ through $R_4$ is obtained as follows:

when $V_{in} > 0$ $$V_o^{(+)} = \left\{ -\frac{R_5}{R_3}\left(-\frac{R_2}{R_1}V_i^{(+)}\right)\right\} + \left\{-\frac{R_5}{R_4}V_i^{(+)}\right\} \quad (1)$$

when $V_{in} < 0$ $$V_o^{(-)} = -\frac{R_5}{R_4}V_i^{(-)} \quad (2)$$

Since the absolute value circuit provides the result, $V_o^{(+)} = V_o^{(-)}$ when $$V_i^{(+)} = |V_i^{(-)}| = -V_i^{(-)} \quad (3)$$

therefore, from equations (1) and (2), $$\left\{-\frac{R_5}{R_3}\left(-\frac{R_2}{R_1}V_i^{(+)}\right)\right\} + \left\{-\frac{R_5}{R_4}V_i^{(+)}\right\} =$$

$$-\frac{R_5}{R_4}V_i^{(-)} = \frac{R_5}{R_4}V_i^{(+)}$$

$(R_2/R_1)(R_5/R_3) - R_5/R_4 = R_5/R_4$
$(R_2/R_1)(1/R_3) = 2/R_4$
$R_2/R_1 = 2R_3/R_4$

Outputs of the absolute value circuits 271 through 273 are connected and are input to the amplifier 277, which outputs the control signal $E_1$. A value of the control signal $E_1$ corresponds to the largest of the absolute values of the tap constants $C_{-1}$ through $C_1$. Therefore, only when the absolute values of all three tap constants $C_{-1}$ through $C_1$ are small does a value of the control signal $E_1$ become small, and accordingly signal attenuation at the variable attenuator 34-1 becomes large. The remaining control signals $E_2$ through $E_6$ are similarly obtained from their associated tap constants.

In above embodiment, the outputs of the tap constant multipliers are arranged at symmetrical positions, are combined symmetrically, and then applied to the variable attenuators. However, the present invention is not restricted only to such constitution. For example, the output of each tap constant multiplier may be individually attenuated by a variable attenuator.

The many features and advantages of the invention are apparent from the detailed specification; and thus, it is intended by the appended claims to cover all such features and advantages of the system which fall within the true spirit and scope of the invention. Further, since numerous modifications and changes may readily occur to those skill in the art, it is not desired to limit the invention to the exact construction and operation shown and described, and accordingly, all suitable modifications and equivalents may be resorted to, falling within the scope of the invention.

We claim:

1. An interference canceller for cancelling interference in a first signal in a communication system that simultaneously processes more than one signal, said interference canceller comprising:
    equalizer means for equalizing the first signal;
    compensating signal generating means for generating a compensating signal from a second signal;
    first timing recovery means, operatively connected to said equalizer means, for detecting the interference in the equalized first signal by detecting and extracting a beat element of amplitude based on a frequency difference element of a pair of data rates of the first and second signals; and
    first control means, operatively connected to said first timing recovery means and said compensating signal generating means, for controlling application of the compensating signal to the first equalized signal based on the detected interference.

2. An interference canceller according to claim 1, wherein the interference canceller is in a receiver, and said interference canceller further comprises:
    first demodulating means, operatively connected to said equalizer means, for demodulating the first signal before the first signal is equalized by said equalizing means; and
    second demodulating means, operatively connected to said compensating signal generating means, for demodulating the second signal before the second signal is used to generate the compensating signal by said compensating signal generating means.

3. An interference canceller according to claim 2, wherein the first and second signals are vertical and horizontal polarizations transmitted over a single channel.

4. An interference canceller according to claim 1, wherein said first timing recovering means detects whether a value of the interference in the equalized first signal is greater than a predetermined value, and said first control means applies the compensating signal to the equalized first signal only if the value of the interference is greater than the predetermined value.

5. An interference canceller according to claim 1, wherein said first timing recovery means determines a value of the interference, and said first control means comprises attenuating means for attenuating the compensating signal based on the determined value of the interference.

6. An interference canceller according to claim 4, wherein said first control means comprises switching means for switching off the application of the compensating signal to the equalized first signal when the value of the interference is below the predetermined value.

7. An interference canceller according to claim 1, further comprising:
    adding means, operatively connected to said equalizer means and said compensating signal generator, for adding the equalized first signal and the compensating signal;
    second timing recovery means, operatively connected to said adding means, for recovering a clock signal from an output of said adding means;
    decision means, operatively connected to said adding means and said second timing recovery means, for sampling and outputting the output of said adding means based on the clock signal; and
    second control means, operatively connected to said decision means, said equalizing means and said compensating signal generating means, for receiving the output of said decision means and the compensating signal from said compensating signal generating means and controlling said equalizer means and said compensating signal generating means based on the received signals.

8. An interference canceller according to claim 1, wherein said compensating signal generating means comprises a transversal equalizer.

9. An interference canceller according to claim 1, wherein said first timing recovery means comprises:
  first rectifying means, operatively connected to said equalizer means, for receiving and rectifying an output of said equalizer means;
  limiter means, operatively connected to said limiter means, for limiting the rectified signal;
  phase comparison means, operatively connected to said limiter means, for outputting a signal including a beat element of the limited rectified signal;
  filter means, operatively connected to said phase comparison means, for extracting the beat element from the output signal;
  second rectifying means, operatively connected to said filter means, for detecting the beat element upon extraction by said filter means; and
  decision means, operatively connected to said second rectifying means, for obtaining a voltage proportional to the amplitude of the beat element from the extracted beat element.

10. An interference canceller according to claim 9, wherein said first control means comprises an attenuator for attenuating the compensating signal based on the voltage obtained by said decision means.

11. An interference canceller according to claim 9, wherein said phase comparison means includes a phase comparator, a loop filter, and a voltage-controlled oscillator connected in series.

12. An interference canceller according to claim 7, wherein said second timing recovery means includes:
  rectifier means, operatively connected to said adder means, for receiving and rectifying an output of said adder means;
  limiting means, operatively connected to said rectifier means, for limiting the rectified signal; and
  phase comparison means, operatively connected to said limiting means, for recovering the clock signal from the output of said adder means, said phase comparison means comprising a phase comparator, a loop filter, and a voltage-controlled oscillator connected in series.

13. An interference canceller according to claim 12, wherein said first timing recovery means detects the interference element by detecting and extracting a beat element from the equalized first signal, and said first control means controls application of the compensating signal to the equalized first signal based on the detected and extracted beat element.

14. An interference canceller according to claim 13, wherein said first timing recovery means comprises:
  first rectifying means, operatively connected to said equalizer means, for receiving and rectifying an output of said equalizer means;
  limiter means, operatively connected to said first rectifying means, for limiting the rectified signal;
  phase comparison means, operatively connected to said limiter means, for outputting a signal including the beat element of the limited signal;
  filter means, operatively connected to said phase comparison means, for extracting the beat element from the output signal;
  second rectifying means, operatively connected to said filter means, for detecting the beat element upon extraction by said filter means; and
  decision means, operatively connected to said second rectifying means, for obtaining a voltage proportional to the amplitude of the beat element from the extracted beat element.

15. An interference canceller according to claim 14, wherein said phase comparison means of said first timing recovery means includes a phase comparator, a loop filter, and a voltage-controlled oscillator connected in series.

16. An interference canceller according to claim 15, wherein a single voltage-controlled oscillator is used as said voltage-controlled oscillator of said first timing recovery means and said voltage controlled-oscillator of said second timing recovery means.

17. A compensating signal generator for generating a compensating signal, to compensate for interference in a first signal transmitted with and interfered by a second signal in a communication system, from first and second channels of the second signal, comprising:
  a predetermined number of first channel delay units connected in series on the first channel;
  a predetermined number of second channel delay units connected in series on the second channel;
  a predetermined number of first channel tap constant multipliers, the predetermined number being one more than the predetermined number of said first channel delay units, connected in branches from the first channel before and after each of said first channel delay units;
  a predetermined number of second channel tap constant multipliers, the predetermined number being one more than the predetermined number of said second channel delay units, connected in branches from the second channel before and after each of said second channel delay units;
  a plurality of adders, operatively connected to said first and second channel tap constant multipliers, for adding outputs from predetermined ones of said first and second channel tap constant multipliers;
  a plurality of variable attenuators, respectively connected to said adders, for receiving and attenuating outputs from said respective adders; and
  adder means, operatively connected to said variable attenuators, for receiving and adding outputs from said variable attenuators and outputting the compensating signal.

18. A compensating signal generator according to claim 17, further comprising:
  first control means, operatively connected to said first and second channel tap constant multipliers, for generating respective tap constants for said first and second channel tap constant multipliers depending on the amplitude and shape of distortion of the first signal; and
  second control means, operatively connected to said first control means, for determining respective control signals for each of said variable attenuators based on the tap constants.

19. A compensating signal generator according to claim 18, wherein said second control means determines the respective control signals for each of said variable attenuators by determining which of the tap constants, which correspond to said first and second channel tap constant multipliers the outputs of which are to be added in said adder corresponding to said attenuator to be controlled, has the largest absolute value, and applying the determined value to said corresponding attenuator.

20. A method for cancelling interference between first and second signals in a communication system, comprising the steps of:
  (a) equalizing the first signal;

(b) generating a compensating signal from the second signal which is transmitted with the first signal;

(c) detecting an interference element in the equalized first signal by detecting and extracting a beat element of amplitude based on a frequency difference element of a pair of data rates of the first and second signals; and (d) applying the compensating signal to the first equalized signal based on the detected interference element to cancel interference in the first signal.

21. A method for cancelling interference according to claim 20, wherein the first and second signals are vertical and horizontal polarizations transmitted over a single channel.

22. A method for cancelling interference according to claim 20, wherein said step (c) further comprises the substeps of:

(i) determining a value of the interference element; and (ii) attenuating the compensating signal based on the determined value of the interference element, and wherein said step (d) further comprises the substep of:

(i) applying the attenuated compensating signal to the first equalized signal.

23. A method for cancelling interference according to claim 20, wherein said step (c) comprises the substeps of:

(i) determining a value of the interference element; and (ii) switching off a switch so that the compensating signal will not be applied to the first equalized signal when the value of the interference element is less than a predetermined value.

* * * * *